United States Patent
Gregoire et al.

(10) Patent No.: US 11,047,054 B2
(45) Date of Patent: Jun. 29, 2021

(54) OXYGEN EVOLUTION REACTION CATALYSIS

(71) Applicant: California Institute of Technology, Pasadena, CA (US)

(72) Inventors: John M Gregoire, Sierra Madre, CA (US); Lan Zhou, Pasadena, CA (US); Santosh K. Suram, Pasadena, CA (US); Aniketa A. Shinde, Duarte, CA (US); Joel A. Haber, Pasadena, CA (US); Dan W. Guevarra, Norwalk, CA (US)

(73) Assignee: California Institute of Technology, Pasadena, CA (US)

( * ) Notice: Subject to any disclaimer, the term of this patent is extended or adjusted under 35 U.S.C. 154(b) by 284 days.

(21) Appl. No.: 15/957,769

(22) Filed: Apr. 19, 2018

(65) Prior Publication Data
US 2018/0305831 A1    Oct. 25, 2018

Related U.S. Application Data

(60) Provisional application No. 62/487,075, filed on Apr. 19, 2017.

(51) Int. Cl.
*C25B 1/55*    (2021.01)
*C25B 11/077*    (2021.01)
*C02F 1/461*    (2006.01)
*C02F 1/467*    (2006.01)

(52) U.S. Cl.
CPC ........ *C25B 11/077* (2021.01); *C02F 1/46109* (2013.01); *C25B 1/55* (2021.01); *C02F 1/4672* (2013.01); *C02F 2001/46133* (2013.01); *C02F 2001/46142* (2013.01)

(58) Field of Classification Search
None
See application file for complete search history.

(56) References Cited

U.S. PATENT DOCUMENTS

| 3,984,353 A | 10/1976 | Sergunkin et al. |
| 6,599,662 B1 * | 7/2003 | Chiang .................. C01B 3/001 |
| | | 429/217 |
| 2015/0292095 A1 | 10/2015 | Haber et al. |

FOREIGN PATENT DOCUMENTS

WO    2001/093348 A2    12/2001

OTHER PUBLICATIONS

Wittmann-Regis, Agnes, International Preliminary Report on Patentability and Written Opinion, PCT/US2018/028428, The International Bureau of WIPO, dated Oct. 31, 2019.

(Continued)

*Primary Examiner* — Tracy M Dove
(74) *Attorney, Agent, or Firm* — Gavrilovich, Dodd & Lindsey LLP

(57) ABSTRACT

An oxygen evolution reaction catalyst is a ternary metal oxide that includes Mn and is represented by $Mn_uSb_vO_w$ in the rutile crystal phase and $M_xMn_yO_z$ where M is selected from the group consisting of Ca, Ni, Sr, Zn, Mg, Ni, Ba, Co and where u/(u+v) is greater than 33%.

9 Claims, 5 Drawing Sheets

(56) References Cited

OTHER PUBLICATIONS

Copenheaver, Blaine R., International Search Report and Written Opinion, PCT/US2018/028428, United States Patent and Trademark Office, dated Jun. 28, 2018.
Søndenå et al., "Corner- versus face-sharing octahedra in AmnO3 perovskites (a=Ca, Sr, and Ba)", Physical Review B, vol. 75, May 14, 2007, pp. 184105-1-184105-10.

* cited by examiner

| Sample | band gap (eV) | EQE×10³ 1.23V_RHE, 385nm | | | | phase |
|---|---|---|---|---|---|---|
| | UV-vis | pH 2.9 | pH 6.6 | pH 10 | pH 13 | |
| CaMnO₃ | 1.41 | | | 0 | 0 | Orthorhombic |
| NiMnO₃ | 1.57 | | 0 | 0 | 0 | Trigonal |
| SrMnO₃ | 1.66 | | | 0.47 | 3.9 | Orthorhombic |
| ZnMn₂O₄ | 1.88 | | 0 | 0 | 0 | Tetragonal |
| MgMn₂O₄ | 2.08 | | 0 | 1.0 | 0 | Tetragonal |
| Ni₆MnO₈ | 2.10 | | | 0.03 | 0.02 | Cubic |
| BaMnO₃ | 2.16 | | | 1.8 | 2.7 | Hexagonal |
| CoMnO₃ | 2.37 | 0 | 0 | | 0 | Trigonal |
| Ca₂Mn₃O₈ | 2.40 | | | 4.8 | 2.7 | Monoclinic |

US 11,047,054 B2

OXYGEN EVOLUTION REACTION CATALYSIS

CROSS REFERENCE TO RELATED APPLICATIONS

This Application claims the benefit of U.S. Provisional Patent Application Ser. No. 62/487,075, filed on Apr. 19, 2017 and incorporated herein in its entirety.

STATEMENT REGARDING FEDERALLY SPONSORED RESEARCH

This invention was made with government support under Grant No. DE-SC0004993/T-112480 awarded by the Department of Energy. The government has certain rights in the invention.

FIELD OF THE INVENTION

The present invention relates to catalysts, and more particularly, to electrocatalysts.

BACKGROUND

A variety of different applications make use of the Oxygen Evolution Reaction (OER). Examples of these applications include solar fuels generation and electrowinning. In applications such as solar fuels generation, the overpotential that can be applied to the electrodes where the oxygen evolution reaction occurs is often limited to the photovoltage that can be achieved as a result of light being incident on semiconductors. Because of this limited overpotential, it is desirable to have a catalyst that is effective at low overpotentials. However, current electrocatalysts often do not provide the desired level of efficiency for low overpotential applications. Further, current catalysts often do not tolerate the acidic conditions that are present in applications such as electrowinning. Additionally, these catalysts often make use of expensive components such as iridium and ruthenium. Accordingly, there is a need for improved Oxygen Evolution Reaction (OER) catalysts.

SUMMARY

A composition of matter includes Mn, Sb, and oxygen arranged in a rutile crystal phase that includes more Mn than Sb.

An oxidation catalyst includes oxygen, Mn and one other component selected from the group consisting of Sb, Ca, Ni, Sr, Zn, Mg, Ni, Ba, and Co. An oxidation catalyst that includes oxygen, Mn, and Sb can be represented by $Mn_uSb_vO_w$ in the rutile crystal phase where $u>0$, $v>0$, $w>0$, and $u/(u+v)$ is greater than 33% or greater than 50%. $u/(u+v)$ is greater than 33% and w is greater than 0.0. Another oxidation catalyst can be represented by $M_xMn_yO_z$ where M is selected from the group consisting of Ca, Ni, Sr, Zn, Mg, Ni, Ba, and Co. When M is Ca then $0.45 \leq x/(x+y) \leq 0.55$ and $1.35 \leq z/(x+y) \leq 1.65$, or $0.36 \leq x/(x+y) \leq 0.44$ and $1.44 \leq z/(x+y) \leq 1.76$. When M is Ni then $0.45 \leq x/(x+y) \leq 0.55$ and $1.35 \leq z/(x+y) \leq 1.65$, or $0.77 \leq x/(x+y) \leq 0.99$ and $1.03 \leq z/(x+y) \leq 1.26$. When M is Sr, Ba, or Co then $0.45 \leq x/(x+y) \leq 0.55$ and $1.35 \leq z/(x+y) \leq 1.65$. When M is Zn, or Mg then $0.30 \leq x/(x+y) \leq 0.37$ and $1.20 \leq z/(x+y) \leq 1.47$.

Photoactive components can be also represented by $M_xMn_yO_z$. In some instances where the oxidation catalyst and/or photoactive component is represented by $M_xMn_yO_z$, the oxidation catalyst and/or photoactive component is in an orthorhombic phase when M represents Ca and $0.45 \leq x/(x+y) \leq 0.55$ or when M represents Sr; in a cubic phase when M represents Ni and $0.77 \leq x/(x+y) \leq 0.99$; in a trigonal phase when M represents Ni and $0.45 \leq x/(x+y) \leq 0.55$ or when M represent Co; in a tetragonal phase when M represents Zn or Mg; in a hexagonal phase when M represents Ba; and in a monoclinic phase when M represents Ca and $1.35 \leq z/(x+y) \leq 1.65$.

An electro-oxidation system such as an oxygen evolution system can include an anode in contact with an anolyte. One or more different layers of the anode can include, consist essentially of, or consist of one or more of the catalysts and/or the photoactive components. In some instances, the anolyte has a pH less than 15 and greater than −1.

DESCRIPTION

Figure 1:
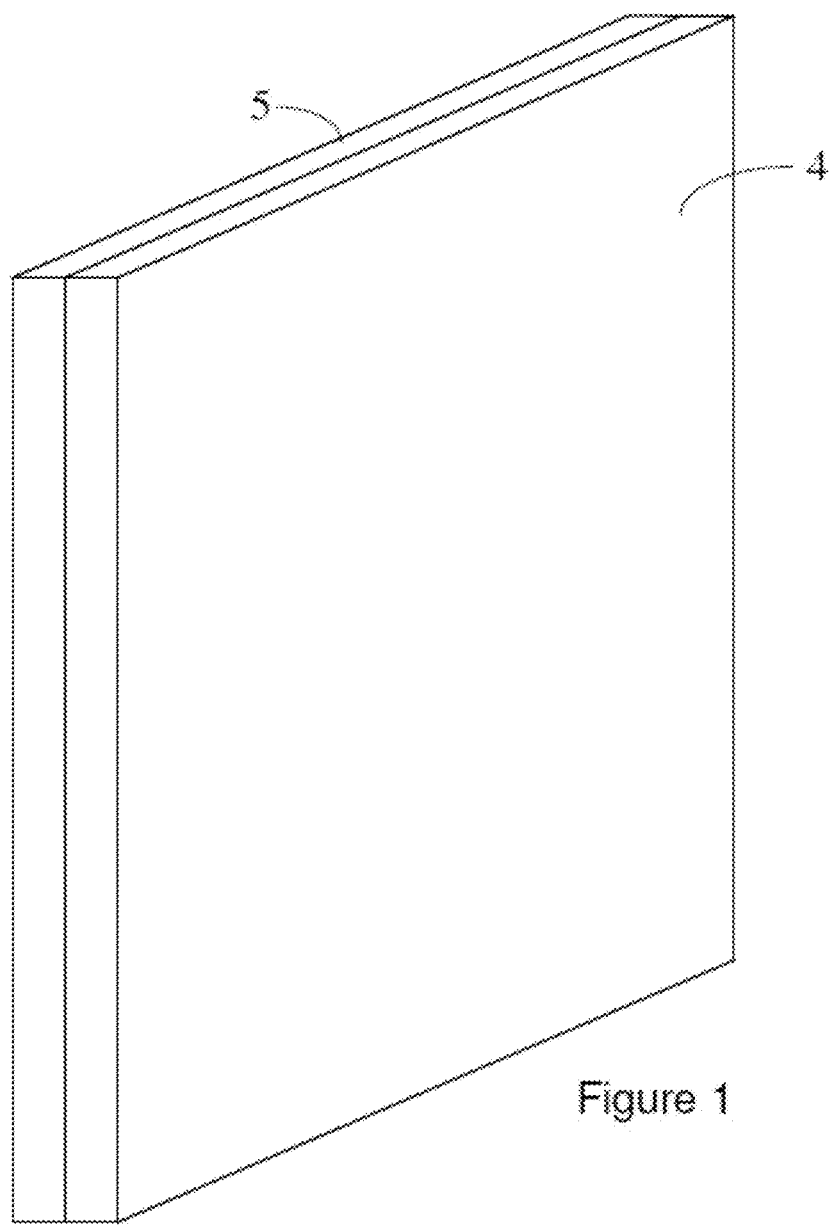
FIG. 1 is a perspective view of an electrode that can include an oxidation catalyst such as an oxygen evolution catalyst.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any methods and materials similar or equivalent to those described herein can be used in the practice or testing of the invention(s), specific examples of appropriate materials and methods are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

The disclosure describes the synthesis and provides a composition of matter that includes Mn, Sb, and oxygen in the rutile crystal phase. The composition of matter is enriched with Mn by alloying Mn in place of Sb in the crystal structure. This approach permits the composition of matter to have a rutile crystal phase where the crystal lattice includes more Mn than Sb.

The disclosure also demonstrates and describes that when the composition of matter includes a ratio of Mn/(Mn+Sb)>1/3, the composition effectively catalyzes reactions such as the Oxygen Evolution Reaction (OER) at low overpotentials. Additionally, the composition of matter consists of earth abundant elements, catalyzes oxygen evolution and is stable at low pH levels. As a result, the catalyst is an effective and cost-effective replacement for catalysts that include iridium and ruthenium.

In one example, the catalyst is represented by $Mn_uSb_vO_w$ in the rutile crystal phase where u>0, v>0, w>0, and u/(u+v) is greater than 33% or greater than 50%. In some instances, w/(u+v) is greater than 0.0 and less than 3.0. The level of oxygen in the catalyst can affect the ability of the catalyst to occupy the rutile phase. The ratio of oxygen to metals in the catalyst can be expressed as w/(u+v). In some instances, w/(u+v) is greater than is greater than 1, or 2 and/or less than 3. The inventors have found that the catalytic activity of rutile $Mn_uSb_vO_w$ increases unexpectedly and dramatically at u/(u+v) around 55%. Additionally, the catalyst becomes less effective as u/(u+v) exceeds 70%. Accordingly, in some instances, u/(u+v) is in a range of 40-70% and is most effective when in a range of 60-70%. Further, the catalyst becomes difficult to fabricate at u/(u+v)>70% because the additional Mn is present in the synthesis result but is not incorporated into the rutile crystal structure and accordingly does not participate in the catalytic activity provided by the rutile $Mn_uSb_vO_w$.

Additionally, the disclosure also provides a class of photoactive components that contain Mn and are photoactive for the oxygen evolution reaction at an applied bias at or below 1.23 V vs RHE. Additionally, a portion of these ternary metal oxides are sufficiently catalytic that an additional oxygen evolution catalyst can be used but is not required. Accordingly, these metal oxides fall within the definition of photosynthetic oxygen evolution photoelectrocatalysts. As a result, the inventors have been able to re-create the most difficult component of photosynthesis. This ability to recreate the natural processes provides more efficient solar fuels generation.

The photoactive components include Mn and O and a component selected from the group consisting of Ca, Ni, Sr, Zn, Mg, Ni, Ba, and Co. For instance, the photoactive component can be represented by $M_xMn_yO_z$ where x>0, y>0, z>0, M is selected from the group consisting of Ca, Ni, Sr, Zn, Mg, Ni, Ba, Co; and when M is Ca then $0.45 \leq x/(x+y) \leq 0.55$ and $1.35 \leq z/(x+y) \leq 1.65$, or $0.36 \leq x/(x+y) \leq 0.44$ and $1.44 \leq z/(x+y) \leq 1.76$; and when M is Ni then $0.45 \leq x/(x+y) \leq 0.55$ and $1.35 \leq z/(x+y) \leq 1.65$, or $0.77 \leq x/(x+y) \leq 0.99$ and $1.03 \leq z/(x+y) \leq 1.26$; and when M is Sr, Ba, or Co then $0.45 \leq x/(x+y) \leq 0.55$ and $1.35 \leq z/(x+y) \leq 1.65$; and when M is Zn, or Mg then $0.30 \leq x/(x+y) \leq 0.37$ and $1.20 \leq z/(x+y) \leq 1.47$. Examples of these photoactive components include $CaMnO_3$, $NiMnO_3$, $SrMnO_3$, $ZnMn_2O_4$, $MgMn_2O_4$, $Ni_6MnO_8$, $BaMnO_3$, $CoMnO_3$, and $Ca_2Mn_3O_8$.

The photoactive nature of these components can be phase specific. Photoactivity can be achieved with the above $M_xMn_yO_z$ in the orthorhombic phase when M represents Ca and $0.45 \leq x/(x+y) \leq 0.55$ or when M represents Sr. Photoactivity can be achieved with the above $M_xMn_yO_z$ in the cubic phase when M represents Ni and $0.77 \leq x/(x+y) \leq 0.99$. Photoactivity can be achieved with the above $M_xMn_yO_z$ in the trigonal phase when M represents Ni and $0.45 \leq x/(x+y) \leq 0.55$ or when M represent Co. Photoactivity can be achieved with the above $M_xMn_yO_z$ in the tetragonal phase when M represents Zn or Mg. Photoactivity can be achieved with the above $M_xMn_yO_z$ in the hexagonal phase when M represents Ba. Photoactivity can be achieved with the above $M_xMn_yO_z$ in the monoclinic phase when M represents Ca and $1.35 \leq z/(x+y) \leq 1.65$.

Examples of photoactive components that also show catalytic activity for oxidation reactions include $M_xMn_yO_z$ where M represents Sr, Mg, B, Ni when $0.77 \leq x/(x+y) \leq 0.99$, or Ca when $1.35 \leq z/(x+y) \leq 1.65$. Specific examples are $SrMnO_3$ in the orthorhombic phase, $MgMn_2O_4$ in the tetragonal phase, $Ni_6MnO_8$ in the cubic phase, $BaMnO_3$ in the hexagonal phase, and $Ca_2Mn_3O_8$ in the monoclinic phase. These materials are sufficiently catalytic that they can be used as a catalyst without being used for their photoactive nature.

Examples of photoactive components that can be used with an additional catalyst for oxidation reactions such as the Oxygen Evolution Reaction (OER) include $M_xMn_yO_z$ where M represents Zn, Co, Ca when $0.45 \leq x/(x+y) \leq 0.55$, and Ni when $0.45 \leq x/(x+y) \leq 0.55$. Specific examples include $CaMnO_3$ in the orthorhombic phase, $NiMnO_3$ in the trigonal phase, $ZnMn_2O_4$ in the tetragonal phase, and $CoMnO_3$ in the trigonal phase. These photoactive components ($CaMnO_3$, $NiMnO_3$, $ZnMn_2O_4$, and $CoMnO_3$) also show catalytic activity for other oxidation reactions such as sulfite oxidation.

The above catalysts serve as oxidation catalysts and can accordingly catalyze a variety of reactions such as the Oxygen Evolution Reaction, the Oxygen Reduction Reaction, and redox reaction for flow batteries. In particular, the catalysts can catalyze the Oxygen Evolution Reaction (OER). The Oxygen Evolution Reaction is where oxygen gas is evolved from water or other oxides. One example of the oxygen evolution reaction is the oxidation of water by: $2H_2O \rightarrow O_2 + 4H^+ + 4e^-$. Another example of the oxygen evolution reaction is $4OH^- \rightarrow O_2 + 2H_2O + 4e^-$.

The catalysts can be electrocatalysts. For instance, the catalyst can have one, two or three features selected from the group consisting of functioning at the surface of an electrode, defining the surface of the electrode, or interacting with one or more components of the environment in which the electrode is positioned. In some instances, the catalyst catalyzes oxygen evolution at the surface of an electrode and/or oxidizes water that is present in the environment in which the electrode is positioned.

FIG. 1 is a perspective view of an electrode that includes the catalyst. The electrode includes a catalytic layer 4 on an electrode base 5. The catalytic layer 4 includes, consists of, or consists essentially of one or more of the catalysts selected from the group consisting of $Mn_uSb_vO_w$ and $M_xMn_yO_z$. The catalytic layer 4 can include components in addition to the one or more catalysts. For instance, the catalytic layer 4 can include one or more components selected from the group consisting of binders, polymers, membranes, electrical conductors, ionic conductors, solid electrolytes, porous materials, and inert support materials. The electrode base 5 represents the portion of the electrode having a traditional electrode construction. Alternately, the electrode base 5 represents the portion of the electrode having a traditional electrode construction but with a prior catalytic layer removed from the electrode. Accordingly, the catalytic layer 4 can be added to a prior art electrode or can replace a catalytic layer 4 on a prior art electrode.

The electrode base 5 can be a current collector such as a metal foil or sheet, mesh, or conducting fabric. As will become evident from the below illustration of a solar fuels generator, the electrode base 5 can be or include a photoactive layer. For instance, the electrode base 5 can include or consist of a material that absorbs light and converts the absorbed light into excited electron-hole pairs that drive a chemical reaction such as electrolysis of water. Although the electrode base 5 is shown as a single layer of material, the electrode base 5 can include multiple layers of material. For instance, the electrode base 5 can include one or more layers of active material on a current collector. In instance where the electrode is employed to oxidize water, the electrode operates as an anode. During fabrication of the electrode, in some instances, the electrode base serves as the support for the catalyst. Accordingly, the catalyst can be formed directly on the electrode base.

Although the catalytic layer 4 is illustrated as being located on one side of the electrode base 5, the catalytic layer 4 can be located on both sides of the electrode base. Additionally or alternately, FIG. 1 illustrates the catalytic layer 4 being located on the electrode base 5; however, the electrode base 5 can be embedded in the catalytic layer 4. For instance, electrode base 5 can be a mesh that is embedded in the catalytic layer 4. Although FIG. 1 illustrates the catalytic layer 4 as a continuous layer of material, the catalytic layer 4 can be patterned so there are openings through the catalytic layer 4 and/or so there are regions of the catalytic layer 4 that are not continuous with one another, such as would occur when the catalytic layer 4 is arranged in islands on the electrode base.

In the illustration of FIG. 1, the face of the catalytic layer is illustrated as being substantially planar. However, the surface area of the catalyst layer can be increased beyond what can be achieved with the planar face. In some instances, increasing the surface area of the catalyst can increase the catalytic current for a given overpotential. A variety of methods can be employed to increase the surface area of the catalyst. For instance, the catalytic layer can be porous and/or can be microstructured using techniques such as mesoscale self assembly, soft lithograph, lithography, anodic etching, or other methods known to the art. In some instances, the catalytic layer is constructed such that the specific surface area of the catalytic layer is much greater than the geometric area of the electrode. This can be expressed as a surface roughness factor (specific surface area/geometric area of the surface area of a planar electrode covered by the catalytic layer). A non-porous catalyst layer with a smooth surface would have a surface roughness factor of 1. The catalytic layer may have surface roughness factors greater than 1, 10, 100 or 1000.

Figures 2, 3:
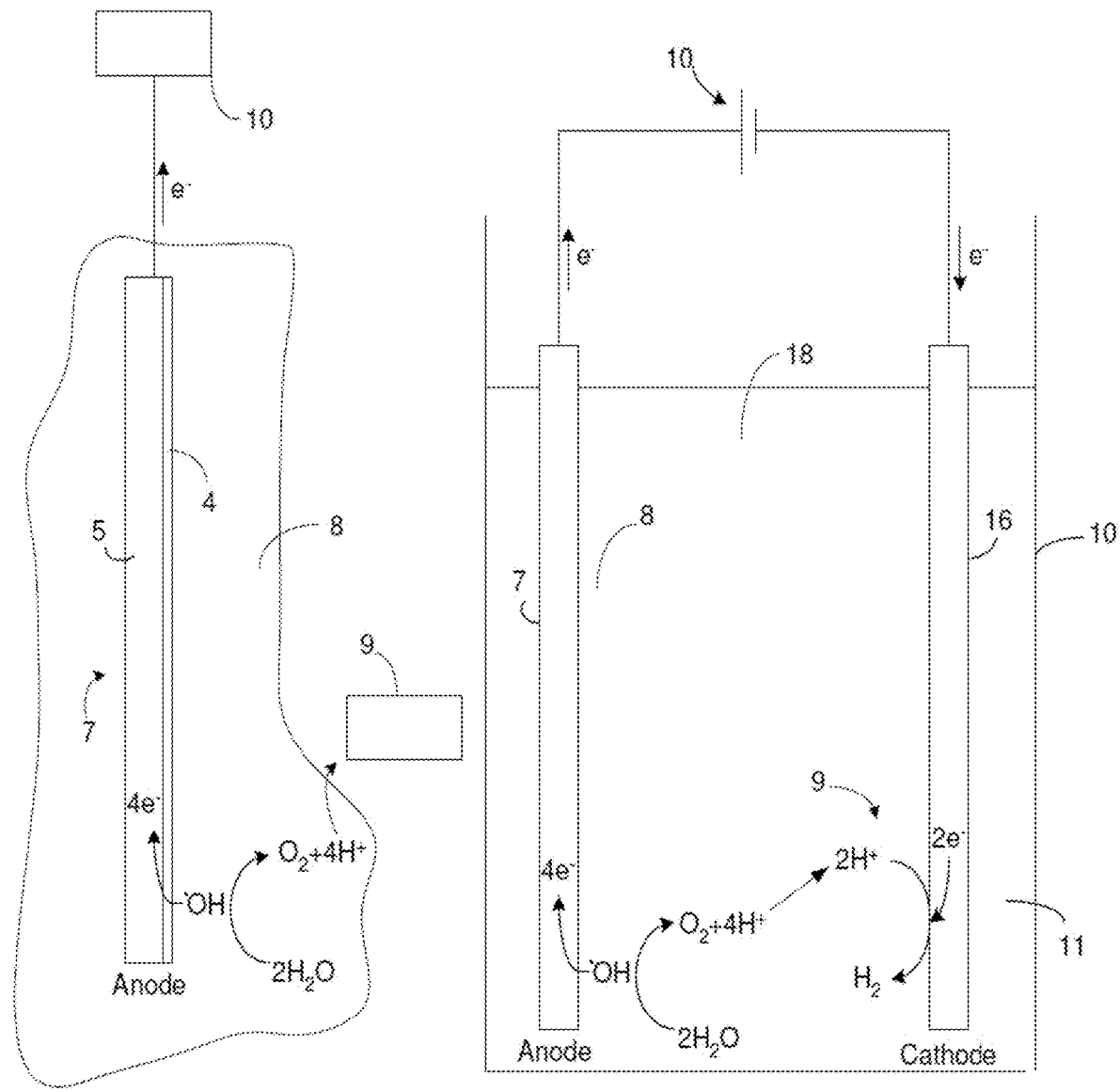
FIG. 2 illustrates an electro-oxidation system such as an oxygen evolution system.
FIG. 3 illustrates a system for water electrolysis that incorporates the electro-oxidation system, of FIG. 2.

The electrode can be employed in an electro-oxidation system such as an oxygen evolution system where the Oxygen Evolution Reaction (OER) is catalyzed at one or more electrodes included in the system. FIG. 2 illustrates an oxygen evolution system. The system includes an anode 7 in contact with an anolyte 8. The electrode of FIG. 1 can serve as the anode 7. The anolyte 8 can be a liquid, solid, or vapor. In some instances, the anolyte 8 includes one or more electrolytes in a solvent or mixture of solvents. Suitable solvents include, but are not limited to, acetonitrile or ethanol. Suitable electrolytes include, but are not limited to, potassium phosphate buffer, boric acid buffer, and sodium hydroxide.

When it is desirable for the oxygen evolution system to operate at steady state, the oxygen evolution system can include a proton-consuming component 9. The proton-consuming component 9 can depend on the application of the oxygen evolution system. For instance, the illustrated oxygen evolution system can be incorporated into a variety of different applications such as water electrolysis systems, solar fuels generators, electrowinning systems, electrolytic hydrogen generators, reversible fuel cells, and reversible air batteries. In one example, the anode and anolyte of FIG. 2 represent the anode and anolyte of a solar fuels generator that pairs the oxygen evolution reaction (OER) at the anode with the $CO_2$ reduction reaction or with the hydrogen evolution reaction (HER). In this example, protons generated by the oxygen evolution reaction (OER) can pass through a separator between the anode and the cathode and serve as a source of protons for the $CO_2$ reduction reaction and/or the hydrogen evolution reaction (HER). The $CO_2$ reduction reaction and/or the hydrogen evolution reaction (HER) consumes the protons generated at the anode and accordingly serves as the proton consuming component 9.

The oxygen evolution systems include a bias source 10. The bias source can also depend on the application of the $CO_2$ reduction system. Examples of suitable bias sources include, but are not limited to, batteries, grid power, solar energy, wind, and hydropower. Another example of a suitable bias source is the anode 7. For instance, the anode 7 can be photoactive. As an example, the electrode base 5 can include or consist of a photoactive component that absorbs light and converts the absorbed light into excited electron-hole pairs that drive the chemical reaction at the anode. Accordingly, the electrode base 5 can serve as the bias source.

The anode 7 can include the catalysts disclosed above. For instance, the catalytic layer 4 can include, consist of, or consist essentially of one or more components selected from the group consisting of $Mn_uSb_vO_w$ and $M_xMn_yO_z$ as disclosed above.

In addition to the above catalysts or as an alternative to the above catalysts, the anode 7 can include the photoactive components disclosed above. For instance, the electrode base 5 can include, consist of, or consist essentially of one or more components selected from the group consisting of $M_xMn_yO_z$. The $M_xMn_yO_z$ can be in the phases disclosed above. As specific examples, the electrode base 5 can include, consist of, or consist essentially of one or more components selected from the group consisting of $CaMnO_3$ in the orthorhombic phase, $NiMnO_3$ in the trigonal phase, $SrMnO_3$ in the orthorhombic phase, $ZnMn_2O_4$ in the tetragonal phase, $MgMn_2O_4$ in the tetragonal phase, $Ni_6MnO_8$ in the cubic phase, $BaMnO_3$ in the hexagonal phase, $CoMnO_3$ in the trigonal phase, and $Ca_2Mn_3O_8$ in the monoclinic phase. The presence of the one or more of the photoactive components in the electrode base 5 allows the anode to operate as a photoanode. Accordingly, the anode 7 can also serve as a bias source in the oxygen evolution system. The electrode base 5 can include other photoactive materials in addition or as an alternative to the above photoactive components. For instance, the electrode base 5 can include or consist of semiconductors. When the electrode base 5 includes or consists of one or more photoactive materials and/or one or more photoactive components, the photoactive materials and/or one or more photoactive components can serve as the current collector or the electrode base 5 can include a current collector.

As noted above, $SrMnO_3$ in the orthorhombic phase, $MgMn_2O_4$ in the tetragonal phase, $Ni_6MnO_8$ in the cubic phase, $BaMnO_3$ in the hexagonal phase, and $Ca_2Mn_3O_8$ in the monoclinic phase have significant catalytic activity. Accordingly, when the electrode base 5 includes, consists of, or consists essentially of one or more of these photoactive components, the anode 7 need not include an additional catalyst. Accordingly, the catalytic layer 4 is optional. For instance, some embodiments of the electrode exclude the catalytic layer 4 and the electrode base 5 includes, consists of, or consists essentially of one or more components selected from the group consisting of $SrMnO_3$ in the orthorhombic phase, $MgMn_2O_4$ in the tetragonal phase, $Ni_6MnO_8$ in the cubic phase, $BaMnO_3$ in the hexagonal phase, and $Ca_2Mn_3O_8$ in the monoclinic phase.

The catalysts and photoactive components disclosed above are stable at low pH levels. In particular, $Mn_uSb_vO_w$ has been shown to be stable under the acidic conditions that are often desired for the oxygen evolution reaction. Accordingly, in some instances, the anolyte is at a pH less than 3, or even 1.

FIG. 3 provides an example of a water electrolysis system that includes the oxygen evolution system of FIG. 2. The system includes a vessel 11 having a reservoir. Anodes 7 and cathodes 16 are positioned in the reservoir such that anodes 7 and cathodes 16 alternate with one another. The anodes 7 and cathodes 16 are parallel or substantially parallel with one another. The anodes are constructed according to FIG. 1 and/or FIG. 2. A medium 18 is positioned in the reservoir such that anodes 7 and the cathodes 16 are in contact with the medium 18. The cathode and anode are connected to a bias source 10 that is sufficient to apply the overpotential needed to cause the water electrolysis illustrated in FIG. 3. The bias source 10 can be any voltage source such as a photovoltaic voltage source, battery or other electronics.

Figure 4A:
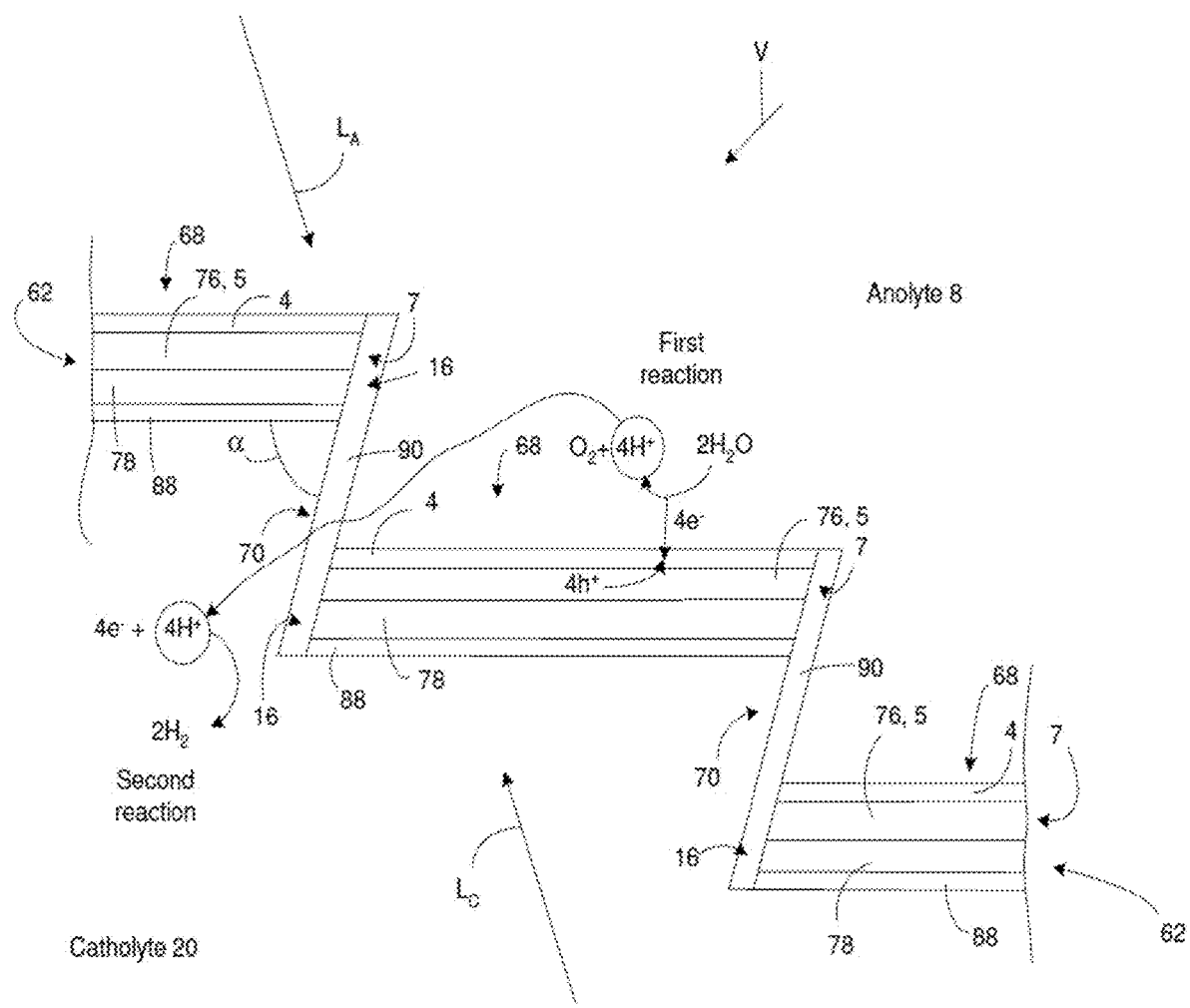
FIG. 4A is a cross section of a solar fuels generator.
Figure 4B:
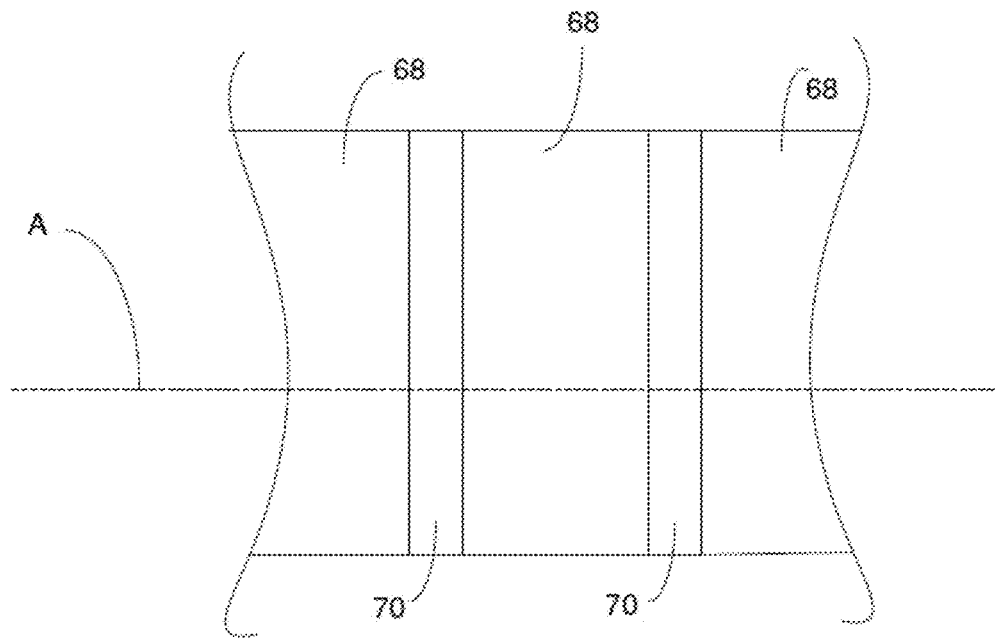
FIG. 4B is a sideview of the solar fuels generator shown in FIG. 4A taken looking in the direction of the arrow labeled V in FIG. 4A. The cross section shown in FIG. 4A can be taken along the line labeled A in FIG. 1B.

FIG. 4A is a cross section of a solar fuels generator that includes the oxygen evolution system of FIG. 2. FIG. 4B is a sideview of the solar fuels generator shown in FIG. 4A taken looking in the direction of the arrow labeled V in FIG. 4A. The cross section shown in FIG. 4A can be taken along the line labeled A in FIG. 1B.

The solar fuels generator includes a barrier 62 between an anolyte 8 and a catholyte 20. The barrier 62 includes or consists of one or more reaction components 68 and one or more separator components 70. FIG. 4A illustrates the reaction components 68 linked with separator components 70 so as to form the barrier 62 between the anolyte 8 and the catholyte 20. The reaction components 68 are alternated with the separator components 70. Each reaction component 68 contacts both the anolyte 8 and the catholyte 20 and each separator component 70 contacts both the anolyte 8 and the catholyte 20. The barrier 62 is formed such that the anolyte 8 can be maintained at a different chemical composition than the catholyte 20. For instance, the barrier 62 can be impermeable or substantially impermeable to nonionic atoms and/or nonionic compounds.

The reaction components 68 include anodes 7 and cathodes 16. As illustrated by the arrow labeled $L_A$ and $L_C$, light is incident on the anodes 7 and/or cathodes 16 during operation of the solar fuels generator. The anodes 7 and cathodes 16 convert the received light into excited electron-hole pairs that drive a chemical reaction, such as the electrolysis of water. The anodes 7 include an anode light absorber 76 that serves as the electrode base 5 discussed in the context of FIG. 2 and FIG. 3. The anode light absorber 76 is selected to absorb light at a wavelength to which the anodes 7 will be exposed during operation of the solar fuels generator. Additionally, the cathodes 16 include a cathode light absorber 78 selected to absorb light at a wavelength to which the cathodes will be exposed during operation of the solar fuels generator.

Suitable materials for the anode light absorbers 76 and the cathode light absorbers 78 include, but are not limited to, the photoactive components disclosed above and semiconductors. In some instances, the anode light absorbers 76 include or consist of one or more components selected from a group consisting of the above photoactive components and semiconductors and/or the cathode light absorbers 78 include or consist of a semiconductor. Example semiconductors for the anode light absorbers 76 include, but are not limited to, metal oxides, oxynitrides, sulfides, and phosphides that are stable in an oxidizing environment such as $WO_3$, $TiO_2$, and TaON. Suitable semiconductors for the cathode light absorbers 78 include, but are not limited to, p-type silicon, InP, $Cu_2O$, GaP, and $WSe_2$.

In some instances, the anode light absorbers 76 and/or the cathode light absorbers 78 are doped. The doping can be done to form one or more pn junctions within the anode light absorbers 76 and the cathode light absorbers 78. For instance, the anode light absorber 76 can be an n-type semiconductor while the cathode light absorber 78 can be a p-type semiconductor. A pn junction can also be present within either the cathode light absorbers 78 or the anode light absorber 76 or both, and is arranged so that electrons flow from the cathode light absorber 78 to a reduction catalyst (discussed below) and holes flow from the anode light absorber 76 to an oxidation catalyst (discussed below).

The dashed lines at the interface of the anode light absorber 76 and the cathode light absorber 78 illustrate an interface between the materials of the anode light absorber 76 and the cathode light absorber 78. However, the anode light absorber 76 and the cathode light absorber 78 can be the same material and/or include the same dopant. As a result, an anode light absorber 76 and the interfaced cathode light absorber 78 can be a continuous block of material. In these instances, the dashed lines shown in FIG. 4A may represent a feature that is not discernable in the solar fuels generator. One example of a material that can serve as both the anode light absorber 76 and the cathode light absorber 78 is p-type silicon, which can function as the absorber on both the anode and cathode. In particular, p-type silicon is a candidate for the cathode material because it is cathodically stable under illumination in acidic aqueous media and in conjunction with various metal catalysts can evolve $H_2(g)$ from $H_2O$.

The absorption of light by the cathode light absorber 78 and the anode light absorber 76 generates the photovoltage that drive a reaction such as water electrolysis. When semiconductors and/or the above photoactive components are used for the cathode light absorber 78 and the anode light absorber 76, the achievable voltage depends on the choice of materials, the associated bandgaps, and doping arrangements, as are known in the field of solar cells. Accordingly, the material selections and arrangements can be selected to provide the desired voltage levels. For instance, tandem and multijunction structures in which two or more components in series add their voltages together can be used in order to achieve elevated voltages.

The anodes 7 include one or more catalytic layers 4 that can be constructed as disclosed above. For instance, the catalytic layer 4 can include or consist of one or more of the above catalysts. For instance, the catalytic layer 4 can include or consist of one or more components selected from the group consisting of $Mn_uSb_vO_w$ and $M_xMn_yO_z$ as disclosed above.

The catalytic layers 4 can be in direct physical contact with the anode light absorber 76. As is evident from FIG. 4A, when light is to be incident on the anode, the light passes through one or more catalytic layers 4 before reaching the anode light absorber 76. As a result, the one or more catalytic layers 4 can be thin enough that the one or more catalytic layers 4 do not absorb an undesirably high level of the incoming light. A suitable thickness for the catalytic layer 4 includes, but is not limited to, a thickness less than 10 nm to a few micrometers.

The cathodes 16 include one or more reduction catalyst layers 88 that each includes or consists of one or more reduction catalysts. One or more reduction catalyst layers 88 can be in direct physical contact with the cathode light absorber 78 as is shown in FIG. 4A. As is evident from FIG. 4A, when light is to be incident on the cathode, the light passes through one or more reduction catalyst layers 88 before reaching the cathode light absorber 78. As a result, the one or more reduction catalyst layers 88 can be transparent and/or thin enough that the one or more reduction catalyst layers 88 do not absorb an undesirably high level of the incoming light. A suitable thickness for a reduction catalyst layer 88 includes, but is not limited to, a thickness of about 1 nm to 10 µm. In some instances, the catalyst layer 88 does not need to be transparent. For instance, the catalyst layer 88 need not be transparent if it is facing down (i.e., is facing away from the incident light source).

Suitable reduction catalysts include, but are not limited to, Pt, NiMo, and NiCo. The one or more reduction catalyst layers 88 are positioned on a surface of the cathode light absorber 78 such that a line that is perpendicular to the surface extends from the surface through one or more of the reduction catalyst layers 88 before extending through the catholyte 20. The one or more reduction catalyst layers can be positioned such that the one or more reduction catalyst layers are on more than 10%, 30%, 50%, 75%, or 90% of the surface of the cathode light absorber 78.

The separator components 70 include or consist of a separator 90 located between the anolyte 8 and the catholyte 20. The separator 90 is ionically conductive. In some instances, the separator 90 is cationically conductive while concurrently being sufficiently nonconductive to the other components of the anolyte 8 and the catholyte 20 that the anolyte 8 and the catholyte 20 remain separated from one another. In other instances, the separator 90 is cationically conductive and non-conductive or substantially non-conductive to nonionic atoms and/or nonionic compounds. In some instances, the separator 90 is cationically conductive while being non-conductive or substantially non-conductive to nonionic atoms and/or nonionic compounds and also to anions. Accordingly, the separator 90 can provide a pathway along which cations can travel from the anolyte 8 to the catholyte 20 without providing a pathway or a substantial pathway from the anolyte 8 to the catholyte 20 to one, two, or three entities selected from a group consisting of anions, nonionic atoms or nonionic compounds. In some instances, it may be desirable for the separator 90 to conduct both anions and cations. For instance, when the anolyte 8 and/or the catholyte 20 has elevated pH levels a separator 90 that conducts both anions and cations may be used. As a result, in some instances, the separator 90 conducts cations and anions but not nonionic atoms or nonionic compounds.

Additionally, in some instances, the separator 90 is able to exchange ions sufficiently to prevent the buildup of a pH gradient, and separate the reaction products sufficiently to prevent them from re-combining. A suitable separator 90 can be a single layer or material or multiple layers of materials. Suitable materials for the separator 90 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. A suitable material is sold under the trademark NAFION®. NAFION® is an example of a material that is cationically conductive of cations but is not conductive of anions or nonionic atoms or nonionic compounds. Another suitable separator 90 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

During operation, the solar fuels generator is exposed to light such as sunlight, terrestrial solar illumination, AM1.5 solar radiation, or similar illumination having approximately 1 kilowatt per square meter of incident energy or less. These light sources can be unconcentrated or can be concentrated using known light concentration devices and techniques. In some instances, the solar fuels generator is oriented such that the light travels through the anodes before reaching the cathodes. When the anode light absorber 76 has a larger bandgap than the cathode light absorber 78, the anodes absorb higher energy (shorter wavelength) light and allow lower energy (longer wavelength) light to pass through to the cathodes. The cathodes can then absorb the longer wavelengths. Alternately, the light can be incident on both the anodes and the cathodes or can be incident on the cathodes before reaching the anodes.

The absorption of light by an anode light absorber 76 generates hole-electron pairs within the anode light absorber 76. The presence of an n-type anode light absorber 76 in the anolyte 8 produces an electrical field that causes the holes to move to the surface of the anode light absorber 76 and then the surface of the oxidation catalyst layer 86 where the oxidation of water occurs as illustrated by the first reaction in FIG. 4A. The electrons generated in the anode light absorber 76 move toward the cathode light absorber 78 as a result of the electrical field.

The protons generated in the first reaction move from the oxidation catalyst layer 86 into the anolyte 8. Since the separator 90 is cationically conductive, the protons move from the anolyte 8 to the catholyte 20 through the separator 90. As a result, the pathlength for the protons is reduced to the thickness of the separator 90. A suitable thickness for the separator 90 is a thickness of about 100 nm to 1 µm or more.

The absorption of light by the cathode light absorber 78 generates hole-electron pairs within the cathode light absorber 78. The presence of a p-type cathode light absorber 78 in the catholyte 20 produces an electrical field that causes the electrons within the cathode light absorber 78 to move to the surface of the cathode light absorber 78 and then the surface of the reduction catalyst layers 88 where they react with the protons to form hydrogen gas as illustrated by the second reaction in FIG. 4A. The generated fuel can enter the catholyte 20 and can be stored for later use. The holes generated in the cathode light absorber 78 by the absorption of light move from the cathode light absorber 78 toward the anode light absorber 76 as a result of the electrical field and can recombine with the electrons from the anode light absorber 76.

The anolyte 8 is generally different from the catholyte 20. For instance, the anolyte 8 generally has a different chemical composition than the catholyte 20. The anolyte 8 and the second phase can both be a liquid. For instance, the anolyte 8 can be a standing, ionically conductive liquid such as water.

The one or more catalytic layers 4 illustrated in FIG. 4A can include materials in addition to the catalyst. For instance, a catalytic layer 4 can include one or more components selected from a group consisting of electrically conductive fillers, electrically conductive materials, diluents, and/or binders. The one or more reduction catalyst layers 88 illustrated in FIG. 4A can include materials in addition to the one or more reduction catalysts. For instance, a reduction catalyst layer 88 can include one or more components selected from a group consisting of electrically conductive fillers, electrically conductive materials, diluents, and/or binders.

A suitable method for forming catalytic layers 4 on the anode light absorber 76 includes, but is not limited to, electrodeposition, sputtering, electroless deposition, spray pyrolysis, and atomic layer deposition. Alternately, the catalytic layers 4 can be a catalytic layer formed directly on the anode light absorber 76 below. A suitable method for forming reduction catalyst layers 88 on the cathode light absorber 78 includes, but is not limited to, electrodeposition, sputtering, electroless deposition, spray pyrolysis, and atomic layer deposition. A suitable method for attaching the separator 90 to the anodes 7 and/or cathodes 16 includes, but is not limited to, clamping, lamination, sealing with epoxy or glue and the like.

EXAMPLES

Example 1

Thin films that included catalysts with Mn, Sb and O were fabricated via physical vapor deposition (sputtering) followed by annealing. The catalysts were deposited on a conducting substrate that serves as a current collector. For these experiments, conducting substrates were glassy carbon substrate, a Si wafer with a Ti adhesion and Pt conducting layer, and glass with a fluorine-doped tin oxide conducting layer. During deposition of the Mn and Sb in a deposition chamber, oxygen was introduced by inclusion of up to 0.16 Pa of $O_2$ in the deposition chamber and sometimes additionally through post-deposition annealing in an $O_2$-containing atmosphere. After annealing in air at 700 C, the rutile phase was obtained for $Mn_uSb_vO_w$ catalysts with an Mn content varying from $Mn_{0.31}Sb_{0.69}$ to $Mn_{0.7}Sb_{0.3}$.

Figure 5:
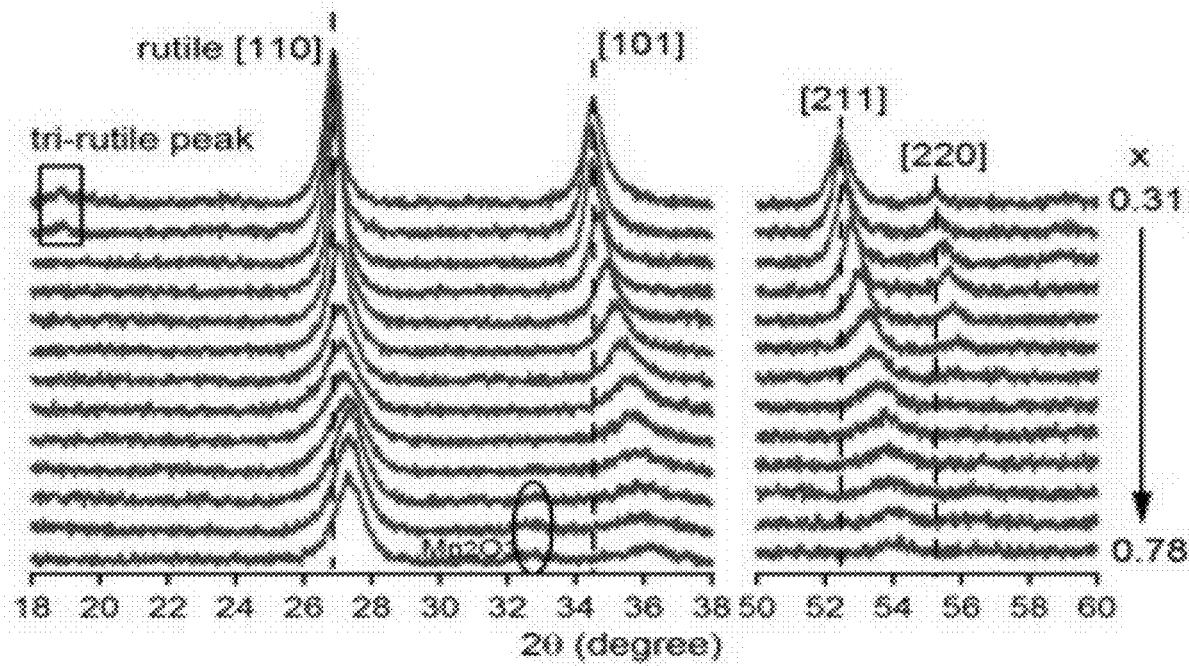
FIG. 5 shows X-ray diffraction (XRD) analysis of an $Mn_uSb_vO_w$ catalysts with Mn content from 31% to 78%.

X-ray diffraction analysis was performed on the $Mn_uSb_vO_w$ catalysts and the results are shown in FIG. 5. The diffraction patterns from Mn contents up to 70% show rutile crystal phase purity. As is evident from oval shape drawn on FIG. 5, the diffraction patterns for Mn contents above 70% show the presence of $Mn_2O_3$ mixed with the rutile phase.

Example 2

The film coated substrates from Example 1 were used as the working electrode in an electrochemical cell containing 1 M sulfuric acid (pH 0.1) with a reference electrode and counter electrode. Example configurations include a flow cell and a rotating disc electrode. Cyclic voltammetry (CV) and chronoamperometry (CA) were performed to assess catalytic activity for the oxygen evolution reaction.

Figures 6, 7:
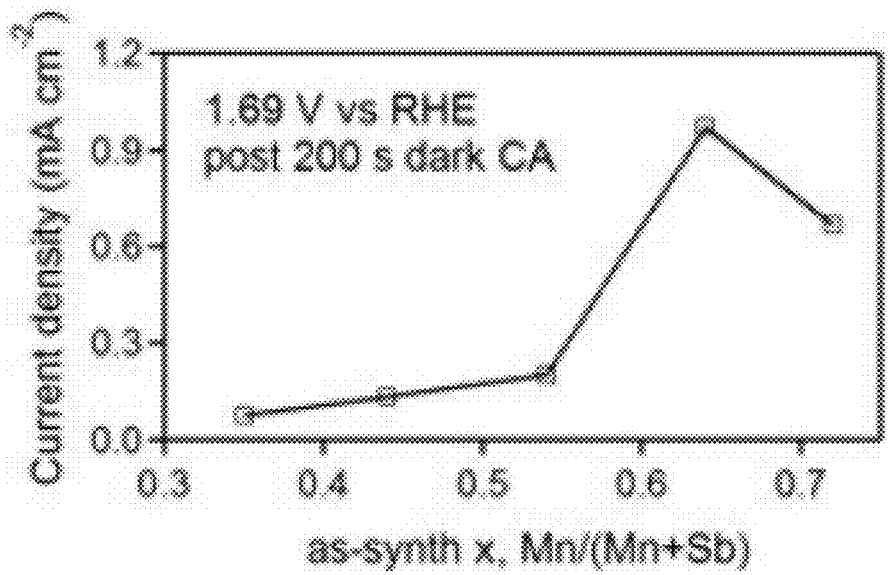
FIG. 6 shows current density after 200 s electrochemical measurement at applied potential of 1.69 V vs RHE in 1.0 M sulfuric acid as a function of Mn content for $Mn_uSb_vO_w$ samples.
FIG. 7 is a table showing experimental results for photoactive components that include Mn and O and a component selected from the group consisting of Ca, Ni, Sr, Zn, Mg, Ni, Ba, and Co.

The result for current density after 200 s CA measurement at 1.69V vs RHE as a function of Mn content (Mn/(Mn+Sb)) is shown in FIG. 6. The catalytic activity increased with amount of Mn in the rutile structure. In particular, at 1.69 V vs RHE (0.46 V overpotential for oxygen evolution reaction), after 200 s of operation the rutile films with 33% to 50% Mn (Mn/(Mn+Sb)) exhibit less than 0.2 mA/cm2 current density, whereas the films with 50-70% Mn (Mn/(Mn+Sb)) have higher catalytic current density of 1 mA/cm2 at 64% Mn (Mn/(Mn+Sb)). The highest current density is obtained with the most Mn-rich composition with only rutile phase. The increase in catalytic activity with increasing Mn concentration is also observed in cyclic voltammograms.

Example 3

Thin films that included catalysts with Mn, Sb and O were fabricated via physical vapor deposition (sputtering) either with or without subsequent annealing. The catalysts were deposited on a conducting substrate, for example a glassy carbon electrode, a Si wafer with a Ti adhesion and Pt conducting layer, or a glass with a fluorine-doped tin oxide conducting layer. During deposition of the Mn and Sb in a deposition chamber, oxygen was introduced by inclusion of up to 0.16 Pa of $O_2$ in the deposition chamber and sometimes additionally through post-deposition annealing in an $O_2$-containing atmosphere. In contrast with Example 1, the rutile phase was obtained without annealing for $Mn_uSb_vO_w$ catalysts with a content of $Mn_{0.55}Sb_{0.45}$ to $Mn_{0.72}Sb_{0.28}$.

Example 4

The film coated substrates from Example 3 were used as the working electrode in an electrochemical cell containing 1 M sulfuric acid (pH 0.1) with a reference electrode and counter electrode. Example configurations include a flow cell and a rotating disc electrode. Cyclic voltammetry and chronoamperometry were performed to assess catalytic activity for the oxygen evolution reaction. The results showed higher current density levels for the $Mn_uSb_vO_w$ catalysts that were only in the rutile crystal phase than were achieved with the corresponding $Mn_uSb_vO_w$ catalysts of Example 1-2. Accordingly, the catalysts that were synthesized without annealing surprisingly showed higher levels of catalytic activity than catalysts where annealing followed deposition.

Example 5

Thin films that included Mn, Sb and O were fabricated via physical vapor deposition (sputtering) on a conducting substrate, for example a glassy carbon electrode, a Si wafer with a Ti adhesion and Pt conducting layer, or a glass with a fluorine-doped-tin oxide conducting layer. During deposition of the Mn and Sb in a deposition chamber, oxygen was introduced by inclusion of up to 0.16 Pa of $O_2$ in the deposition chamber and sometimes additionally through post-deposition annealing in an $O_2$-containing atmosphere. After annealing in air at 900° C., X-ray diffraction analysis performed on the film showed a hexagonal phase in addition to the rutile phase. The film was also tested for catalytic activity but resulted in less catalytic activity than the $Mn_uSb_vO_w$ catalysts in the rutile phase, demonstrating the superior performance of the pure rutile phase.

Example 6

Samples of $CaMnO_3$ in the orthorhombic phase, $NiMnO_3$ in the trigonal phase, $SrMnO_3$ in the orthorhombic phase, $ZnMn_2O_4$ in the tetragonal phase, $MgMn_2O_4$ in the tetragonal phase, $Ni_6MnO_8$ in the cubic phase, $BaMnO_3$ in the hexagonal phase, CoMnO$_3$ in the trigonal phase, Ca$_2$Mn$_3$O$_8$ in the monoclinic phase were generated as described in Example 1 or through a similar procedure where the metals were deposited with no oxygen in the sputter chamber and oxygen was introduced exclusively through post-annealing at 550, 700 or 900° C.

Photoelectrochemistry (PEC) experiments were conducted on each of the samples using fiber coupled scanning droplet cell instrumentation with pH 2.9 (phosphate-acid buffer), pH 6.8 (phosphate-base buffer), pH 10 (borate buffer), and/or pH 13 (sodium hydroxide) electrolytes. Samples were illuminated by a light emitting diode (385 nm wavelength, 0.86-1.5 mm spot diameter) cycled on/off for 0.5 s while held at oxygen evolution reaction potential of 1.23 V versus RHE for 30 s chronoamperometry measurements. The samples showed higher current under illumination than without illumination and this difference was used to calculate the external quantum efficiency (EQE) which was different for each sample in each electrolyte. Photocurrent was typically tested for 30 minutes to establish the stable operation of the sample. The band gap of the sample was also measured. For the Ca$_2$Mn$_3$O$_8$ and BaMnO$_3$ samples, the samples were confirmed to be photoactive for photon energies above the band gap energy. The results are shown in FIG. 7. Since all of these band gaps are in the visible range, these samples are well suited for solar photochemistry applications including solar fuel generation and degradation of organics for water treatment.

Although the electro-oxidation system is disclosed above in the context of an oxygen evolution system, the disclosed electro-oxidation system can be used in conjunction with other reactions such as sulfite oxidation, ferrocene/ferrocenium redox couple, and dye degradation.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An electro-oxidation system for oxygen evolution, comprising:
    a photoanode comprising an oxidation catalyst that includes Mn$_u$Sb$_v$O$_w$ in a rutile crystal phase where u is greater than 0, v is greater than 0, w is greater than 0 and u/(u+v) is greater than 33%.

2. The system of claim 1, wherein u/(u+v) is greater than 55%.

3. The system of claim 2, wherein u/(u+v) is greater than 55% and less than or equal to 70%.

4. The system of claim 1, wherein the photoanode includes a catalytic layer on a current collector and the catalytic layer includes the catalyst.

5. The system of claim 1, wherein the photoanode contacts an anolyte having a pH less than 3.

6. The system of claim 5, wherein the Mn$_u$Sb$_v$O$_w$ catalyzes oxygen evolution.

7. The system of claim 1, further comprising:
    a bias source that applies a bias at or below 1.23 V vs RHE to the photoanode during operation of the system so as to generate oxygen.

8. The system of claim 1, wherein the photoanode absorb light and convert the absorbed light into excited electron-hole pairs during operation of the system so as to generate oxygen.

9. The system of claim 1, wherein the photoanode catalyze the oxygen evolution reaction during operation of the system so as to generate oxygen.

* * * * *